Dec. 16, 1958 A. MAYER 2,864,924
ELECTROMECHANICAL RESOLVER
Filed July 18, 1955 4 Sheets-Sheet 1
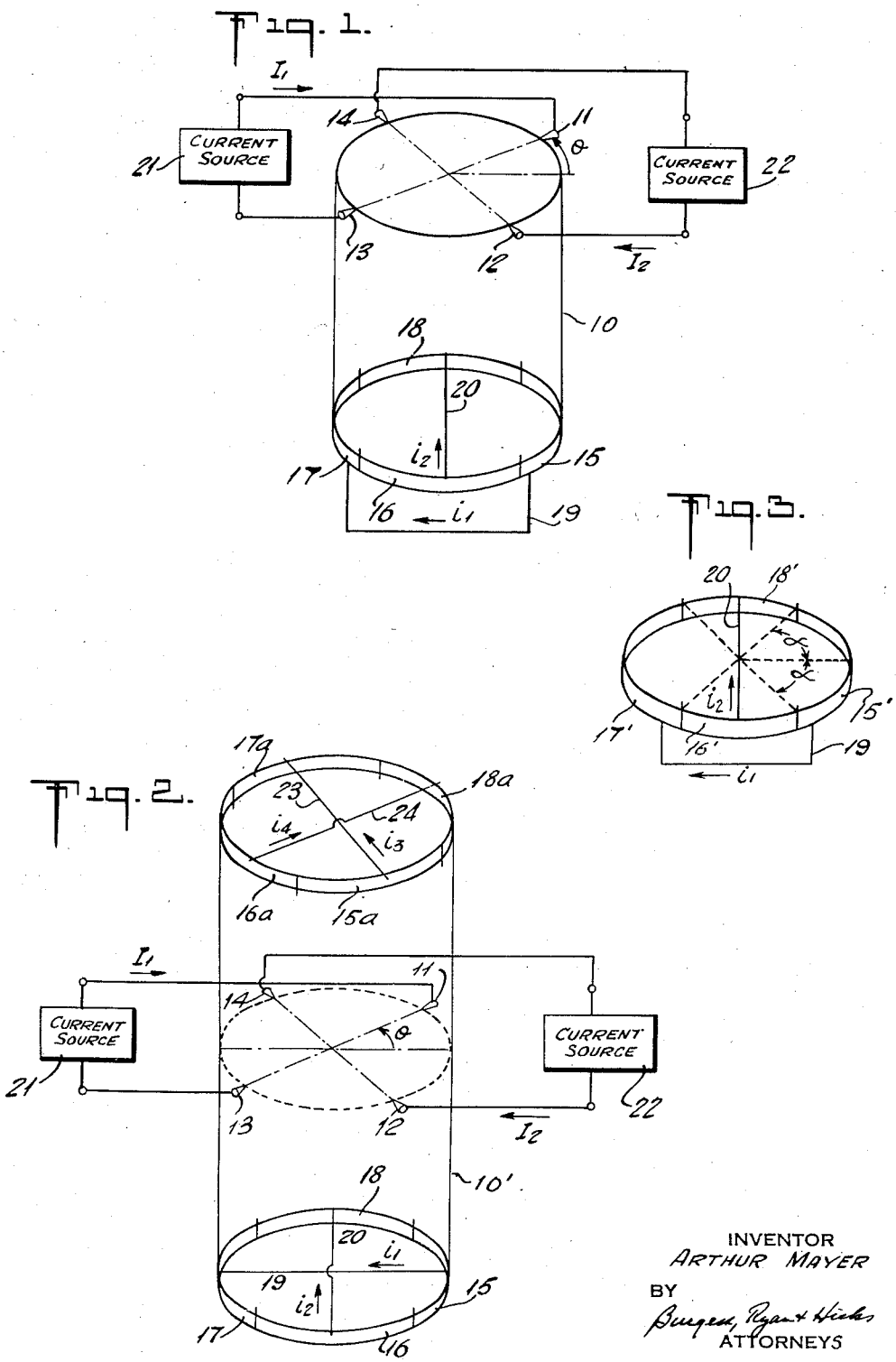
INVENTOR
ARTHUR MAYER
BY
ATTORNEYS Dec. 16, 1958  A. MAYER  2,864,924
ELECTROMECHANICAL RESOLVER
Filed July 18, 1955  4 Sheets-Sheet 2

INVENTOR
ARTHUR MAYER
BY
ATTORNEYS

Dec. 16, 1958 A. MAYER 2,864,924
ELECTROMECHANICAL RESOLVER
Filed July 18, 1955 4 Sheets-Sheet 3
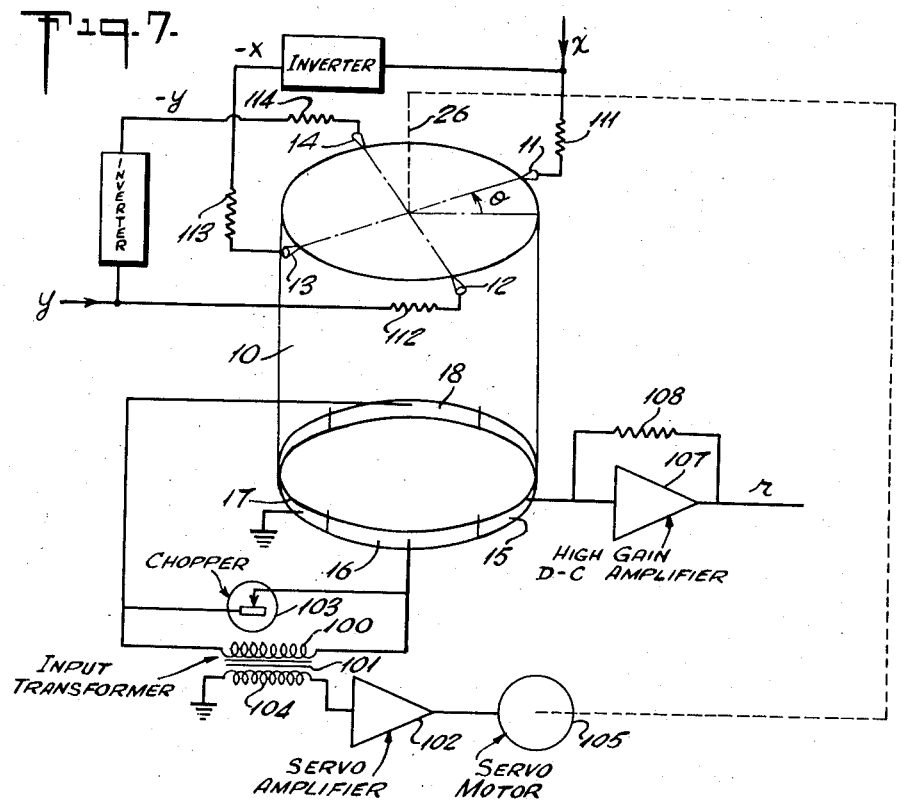
INVENTOR
ARTHUR MAYER
BY
ATTORNEYS Dec. 16, 1958  A. MAYER  2,864,924
ELECTROMECHANICAL RESOLVER
Filed July 18, 1955  4 Sheets-Sheet 4
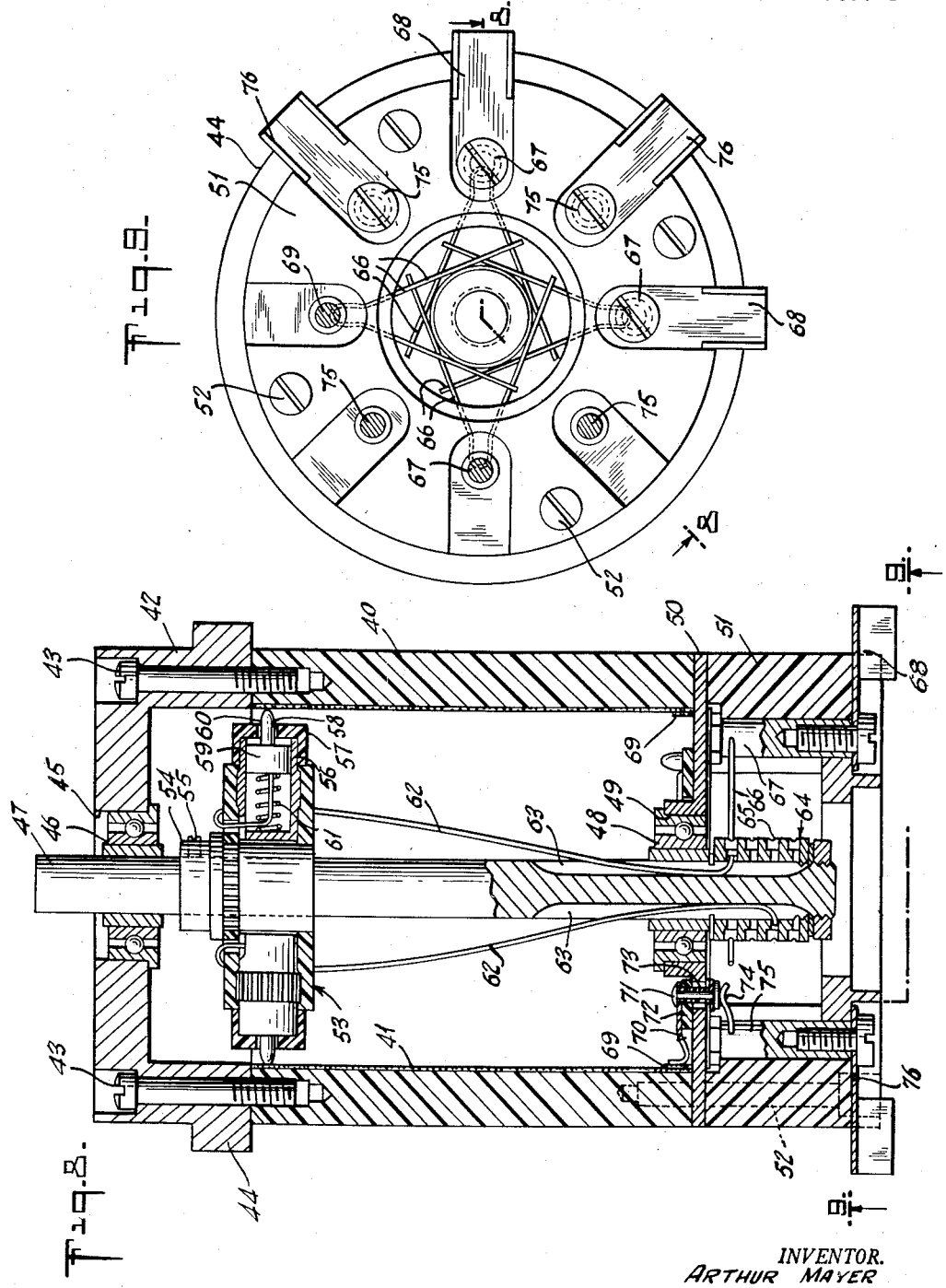
INVENTOR.
ARTHUR MAYER
BY
Burgess, Ryan & Hicks
ATTORNEY United States Patent Office 2,864,924
Patented Dec. 16, 1958

2,864,924

ELECTROMECHANICAL RESOLVER

Arthur Mayer, Bronx, N. Y., assignor to Reeves Instrument Corporation, New York, N. Y., a corporation of New York Application July 18, 1955, Serial No. 522,680

34 Claims. (Cl. 201—48)

The present invention relates to a component for computing equipment, and relates, more particularly, to an electromechanical resolver for use in an analog computing system.

Resolvers are commonly used in computing systems to produce one or more outputs that depend upon one or more inputs, and that are also sinusoidal functions of the angle of rotation of a shaft. An object of the present invention is to provide an electromechanical resolver that may be used with either direct current inputs or with alternating current inputs. A further object of the invention is to provide an electromechanical resolver which will provide accuracy within desired limits and which will be compact and economical to construct.

Other objects and advantages of the present invention will be apparent and best understood from the following description and the accompanying drawings, in which:

Fig. 1 is a diagrammatic illustration in perspective of a resolver embodying the invention;

Fig. 2 is a diagrammatic illustration in perspective of a modified resolver embodying the invention;

Fig. 3 is a diagrammatic illustration of a modified form of contact ring for use in a resolver embodying the invention;

Fig. 7 is a diagrammatic illustration of a computing circuit including a resolver embodying the invention;

Fig. 8 is a side view in vertical section taken along the line 8—8 of Fig. 9, of a resolver embodying the invention;

Fig. 9 is a section view taken along the line 9—9 of Fig. 8; and

Fig. 10 is a diagrammatic illustration of certain elements of the resolver shown in Fig. 8 in a developed condition.

Figure 4:
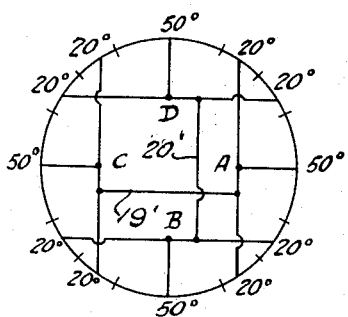
Fig. 4 is a diagrammatic illustration of a modified form of segmental contact ring for use in a resolver embodying the invention.

Referring to the drawings in detail, the resolver illustrated in Fig. 1 consists of a resistive element or surface 10 in the form of a right cylinder which is contacted at one end by four spaced brushes 11, 12, 13, 14, and bounded at the other end by a conductive ring which is divided into four segments 15, 16, 17, 18.

As described hereinafter, the resistive surface 10 may be formed by depositing a carbon or metallic film upon an insulating material. The resistive surface may also be formed by applying a thin coating of a conductive plastic upon an insulating material, or by a thin layer of other resistive materials suitably supported and suitably insulated. The resistive surface may be located on the outside surface of a cylinder, or on the inside surface of a hollow cylinder.

The brushes 11, 12, 13, 14 are supported so as to contact the resistive surface 10 at 90° intervals along the upper edge of the cylinder. The brushes may be rotatable as a group about the central axis of the cylinder; or the brushes may be fixed, and the cylinder may be rotatable relative to the brushes.

The conductive ring consists of a metallic band encircling the cylinder, and may be formed by applying a conductive paint directly on the resistive surface. The divisions that separate the ring into the four segments 15, 16, 17, 18 extend through the resistive surface and occur at 90° intervals, so that each segment forms an arc of 90°.

The operation of the device described is as follows: As shown in Fig. 1, opposite segments of the conductive ring are connected together by wires 19 and 20 and opposite brushes are connected together through current sources 21 and 22, respectively. Input currents $I_1$ and $I_2$ are supplied by the current sources to the respective sets of brushes and output currents $i_1$ and $i_2$ flow in the wires 19 and 20, respectively. The output currents $i_1$ and $i_2$ will depend upon the location or angular position of the brushes with respect to the segments of the conductive ring.

The angular position of the brushes relative to the segments of the conductive ring will be denoted as the angle $\theta$ which is the angle through which the brushes have been rotated from a reference position, which will arbitrarily be taken to be the position in which brush 11 is directly over the midpoint of segment 15. The device described above functions as a resolver because the currents in the wires 19 and 20 will be:

$$i_1 = c\,(I_1 \cos\theta + I_2 \sin\theta) \qquad (1)$$
$$i_2 = c\,(-I_1 \sin\theta + I_2 \cos\theta)$$

where $c$ is a constant factor of proportionality.

In actual practice there will be a slight error in each of the output currents $i_1$ and $i_2$ that are obtained; that is, the values of the output currents $i_1$ and $i_2$ will not be exactly in accord with the Equations 1 for all values of the angle $\theta$. The error is in part due to physical imperfections that will exist in any particular resolver, and is in part inherent in the general design. The present invention relates particularly to minimizing the part of the error that is inherent in the general design.

In an ideal resolver, i. e., a resolver without physical imperfections, the resistive surface is a right-circular cylinder, the upper boundary of the conductive ring is a true circle, the divisions in the conductive ring are accurately spaced, and the four brushes make contact with the resistive surface on a true circle at points exactly 90° apart.

Also, the resistive surface should be as uniform as possible in the peripheral direction; that is, the electrical conductivity of the surface should be the same at all points of any true circle on the surface. The resistive surface need not be uniform in the longitudinal direction; that is, the electrical conductivity of the surface on one circle need not be the same as the electrical conductivity on another circle. Furthermore, the resistivity of the conductive ring should be practically zero compared with the resistivity of the resistive surface, and the resistance of each of the wires 19 and 20 is practically zero.

The part of the error that is due to physical imperfections can be held to a minimum by the qualities of the materials and the methods of manufacture that are used in the making of a resolver embodying the invention.

The part of the error that is inherent in the general design will now be discussed in detail and for the purpose of this discussion it will be assumed that the conditions for an ideal resolver apply. It will further be assumed that the resistive surface is uniform in the longitudinal, as well as in the peripheral direction. Departures from longitudinal uniformity, provided that they are not too radical, do not materially affect the error, but to allow for them would seriously complicate the following discussion.

The accuracy of the resolver is dependent upon the ratio of the height of the cylinder to its radius as explained hereinafter. Let H represent the ratio of the distance between the upper boundary of the conductive ring and the brushes to the radius of the cylinder. In Fig. 1, the distance between the brushes and the conductive band is the height of the cylinder. For the sake of simplicity, it will be assumed that the input current $I_2=0$. Then it can be shown, by the application of classical potential theory, that $$\frac{i_1}{I_1} = \frac{2\sqrt{2}}{\pi}\left(\frac{\cos\theta}{\cosh H} + \frac{\cos 3\theta}{3\cosh 3H} - \frac{\cos 5\theta}{5\cosh 5H} - \cdots\right) \quad (2)$$

that is, the ratio of the output $i_1$ to the input $I_1$ is proportional to a Fourier series that consists of odd harmonics of a sinusoidal function of $\theta$. The ratio of the output $i_2$ to the input $I_1$ can also be expressed by a sum of harmonics with the same amplitudes as the harmonics in Equation 2.

The first harmonic in the series of Equation 2 represents the ratio of output to input that is required in a resolver. All the other harmonics, therefore, must be made as small as possible.

The relative amplitude of the $n$th harmonic—that is, the ratio of the amplitude of the $n$th harmonic to the amplitude of the 1st harmonic—is $$\frac{\cosh H}{n \cosh nH}$$

which is nearly equal to $$\frac{e^{(1-n)H}}{n}$$

provided that H is not too small. Thus, if $H=2$, the relative amplitude of the third harmonic is $$\frac{e^{-4}}{3} = .006$$

the relative amplitude of the fifth harmonic is $$\frac{e^{-8}}{5} = .00007$$

and the higher harmonics are negligible. The absolute amplitude of the first harmonic is $$\frac{2\sqrt{2}}{\pi \cosh 2} = .24$$

Since the series of Equation 2 converges so rapidly when $H=2$, it is safe to say that the sum of all the terms besides the first is always less than 1% of the maximum value of the first term. Thus if $H=2$—that is, if the height of the cylinder is two times its radius—it may be said that the output current $i_1$ is given with an accuracy of better than 1% by the expression:

$$i_1 = .24 \, I_1 \cos\theta \quad (3)$$

It can further be shown that other portions of the Equations 1 are accurate to better than 1%, in the same sense that Equation 3 is accurate to better than 1%.

For many computing applications, an accuracy better than 1% may be required. With reference again to the series of Equation 2, if the ratio of the height of the cylinder to the radius is increased so that $H=3$, then the relative amplitude of the third harmonic will be $$\frac{e^{-6}}{3} = .0008$$

but the amplitude of the first harmonic itself will decrease to $$\frac{2\sqrt{2}}{\pi \cosh 3} = .09$$

It is possible, however, by modifying the design, to eliminate the unwanted third harmonic without materially attenuating the first harmonic, and without materially increasing other harmonics.

The embodiment of the invention illustrated in Fig. 2 shows one way of accomplishing this result. For convenience, parts in this figure corresponding to parts shown in Fig. 1 have been identified by the same reference numerals and their description need not be repeated in detail here. Three ways of accomplishing this result will be described.

As shown in Fig. 2, the cylindrical resistive surface 10' is extended in length, with a second conductive ring being applied at the upper end thereof and the brushes making contact at the middle of the cylinder. The upper ring, like the lower one, is divided into four 90° segments 15a, 16a, 17a, 18a, but the divisions in the upper ring are shifted in phase by 60° relative to the corresponding divisions in the lower ring.

Keeping the same definition of H, the distance from the brushes to either the upper boundary of the lower ring or the lower boundary of the upper ring is H times the radius of the cylinder and thus, the height of the cylinder is 2H times its radius. As previously described, the opposite segments of the lower conductive ring are connected by wires 19 and 20 and the opposite segments of the upper conductive ring are connected by wires 23 and 24. The wires 19, 20, 23, and 24 will respectively carry output currents $i_1$, $i_2$, $i_3$, and $i_4$ when input currents $I_1$ and $I_2$ are supplied, as shown, to the resistive surface through the brushes from the sources 21 and 22. Accordingly, if the input $I_2=0$, then $$\frac{i_1}{I_1} = \frac{\sqrt{2}}{\pi}\left(\frac{\cos\theta}{\cosh H} + \frac{\cos 3\theta}{3\cosh 3H} - \frac{\cos 5\theta}{5\cosh 5H} - \cdots\right) \quad (4)$$

The right hand side of Equation 4 is equal to one-half the right hand side of Equation 2 because only one-half of the input current $I_1$ flows through the lower half of the cylindrical surface and the other half of the input current $I_1$ flows through the upper half of the cylindrical surface. Since the divisions in the upper ring are shifted 60° away from the corresponding divisions in the lower ring, the output current $i_3$ in the wire 23 will be given by the following expression:

$$\frac{i_3}{I_1} = \frac{\sqrt{2}}{\pi}\left(\frac{\cos\left(\theta+\frac{\pi}{3}\right)}{\cosh H} - \frac{\cos 3\theta}{3\cosh 3H} - \frac{\cos\left(5\theta-\frac{\pi}{3}\right)}{5\cosh 5H} - \cdots\right) \quad (5)$$

Thus, when the output currents $i_1$ and $i_3$ in the wires 19 and 23 are added together, the result is $$\frac{i_1+i_3}{I_1} = \frac{\sqrt{2}}{\pi}\left(\frac{\sqrt{3}\cos\left(\theta+\frac{\pi}{6}\right)}{\cosh H} - \frac{\sqrt{3}\cos\left(5\theta-\frac{\pi}{6}\right)}{5\cosh 5H} - \cdots\right) \quad (6)$$

Similarly, the sum of the output currents $i_2$ and $i_4$ in the wires 20 and 24 will be found to contain no third harmonic.

If $H=2$, so that the height of the cylinder is four times the radius, then the absolute amplitude of the first harmonic in the series (6) is $$\frac{\sqrt{6}}{\pi \cosh 2} = .21$$

The relative amplitude of the fifth harmonic is unchanged from before.

Accordingly, if H is equal to or greater than 2, the outputs as represented by the following two equations will be accurate to better than .01%:

$$i_1+i_3=c\left[I_1 \cos\left(\theta+\frac{\pi}{6}\right)+I_2 \sin\left(\theta+\frac{\pi}{6}\right)\right]$$
$$i_2+i_4=c\left[-I_1 \sin\left(\theta+\frac{\pi}{6}\right)+I_2 \cos\left(\theta+\frac{\pi}{6}\right)\right] \quad (7)$$

with the value of $c$ equal to .21 when $H=2$.

Except for a phase angle shift of 30°, the right hand sides of Equations 7 are identical with the right hand sides of Equations 1.

The third harmonic may also be eliminated by the manner in which the divisions in the conductive ring are arranged. Under such conditions, the conductive ring will no longer be divided into four equal segments.

Fig. 3 illustrates a conductive ring which may be applied to a resolver such as shown in Fig. 1 and in which segments 15' and 17' each cover an arc $2\alpha$ instead of 90°, and the intermediate segments 16' and 18' each cover an arc $(\pi-2\alpha)$. Assuming again that the input current $I_2=0$, it can be shown that:

$$\frac{i_1}{I_1}=\frac{4}{\pi}\left(\frac{\sin \alpha \cos \theta}{\cosh H}+\frac{\sin 3\alpha \cos 3\theta}{3 \cosh 3H}+\frac{\sin 5\alpha \cos 5\theta}{5 \cosh 5H}+\cdots\right)$$

The series of Equation 2 is a special case of the above expression (8) that obtains when $\alpha=45°$. However, the third harmonic vanishes if $\alpha=60°$. This condition is realized if segments 15' and 17' are each 120°, and intermediate segments 16' and 18' are each 60°. If $H=2$, the absolute amplitude of the first harmonic is $$\frac{4 \sin 60°}{\pi \cosh 2}=.29$$

The relative amplitude of the fifth harmonic is still unchanged from before.

Whatever the value of the input current $I_2$, if H is equal to or greater than 2, the output as represented by the following equation will be accurate to better than .01%:

$$i_1=c(I_1 \cos \theta+I_2 \sin \theta) \quad (9)$$

with the value of $c$ equal to .29 when $H=2$.

Equation 9 is identical with the first of the pair of Equations 1. The output current $i_2$ in the wire 20, however, will have a relatively large third harmonic content. Therefore, if it is required to have two accurate output currents, it would be necessary to make a double height-resolver similar to the one shown in Fig. 2. The upper conductive ring would consist of alternate 60° and 120° segments like the lower ring, but the divisions in the upper ring would be shifted in phase by 90° relative to the corresponding divisions in the lower ring. Under such conditions, if $H=2$, the amplitude of each of the two outputs would be half of .29, because the input currents $I_1$ and $I_2$ would distribute themselves over both valves of the cylindrical surface.

Two outputs of suitable accuracy can be obtained with a single-height resolver as shown in Fig. 1 if the conductive ring, instead of being divided into four segments, is divided into twelve segments, as shown in Fig. 4, with every third segment being 50° and two segments of 20° each intervening between the 50° segments. With such an arrangement, the segments are connected as shown in Fig. 4, with four junctions A, B, C, D being formed and a wire 19' connecting the junctions A and C, and a wire 20' connecting the junctions B and D.

Assuming that the input $I_2=0$, the Formula 8 can be applied to opposite pairs of segments—taking into account the phase of the segments, as in the derivation of Equation 5—to find the current between the members of each pair. The output current in the wire 19' is the sum of three such currents, and the output current in the wire 20' is the sum of the other three. The output current $i_1$ in the wire 19' is given by the following expression:

$$\frac{i_1}{I_1}=\frac{4}{\pi}\left(\frac{.622 \cos \theta}{\cosh H}+\frac{.953 \cos 5\theta}{5 \cosh 5H}+\cdots\right) \quad (10)$$

The series of Equation 10 contains no third harmonic term. The relative amplitude of the fifth harmonic is $.31\ e^{-4H}$, while the amplitude of the first harmonic itself is $$\frac{2.5}{\pi \cosh H}$$

If $H=2$, these amplitudes are respectively .0001 and .21.

Thus, it follows that if the segments in the conductive ring are arranged and connected as shown in Fig. 4, and if the height of the cylinder is equal to or greater than its diameter, there will result a resolver in which the outputs will correspond to the Equations 1 with an accuracy of .01%, with the value of $c$ being equal to .21 when $H=2$.

Figure 5:
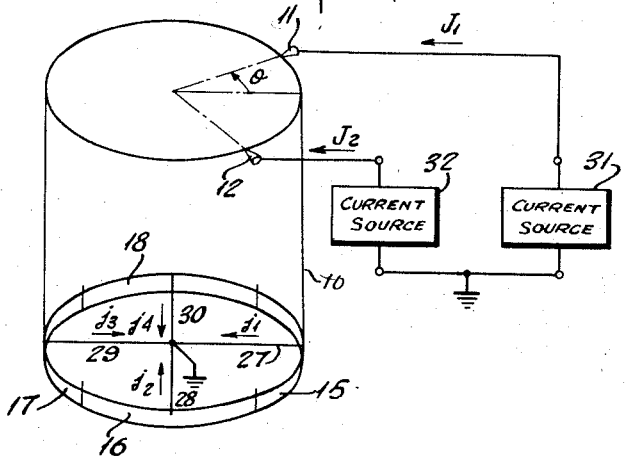
Fig. 5 is a diagrammatic illustration of a resolver embodying the invention with modified electrical connections.

The resolver illustrated in Fig. 1 may also be connected as shown in Fig. 5, where only two brushes 11 and 12 are employed. In this arrangement, the segments 15, 16, 17, 18 of the conductive ring are connected through wires 27, 28, 29, 30 to a common ground, and the brushes 11 and 12 are connected through current sources 31 and 32, respectively, to ground.

With the input currents from the sources 31 and 32 being designated as $J_1$ and $J_2$, the difference between the output currents $j_1$ and $j_3$ in the wires 27 and 29, respectively, and the difference between the output currents $j_2$ and $j_4$ in the wires 28 and 30, respectively, may be expressed as follows:

$$j_1-j_3=c(J_1 \cos \theta+J_2 \sin \theta) \quad (11)$$
$$j_2-j_4=c(-J_1 \sin \theta+J_2 \cos \theta)$$

where $c$ is the same constant that appears in Equations 1.

The foregoing discussion concerning the design and elimination of harmonics, that pertains to the Equations 1 applies with equal force to the Equations 11; and the same measures may be adopted to eliminate the errors.

Figure 6:
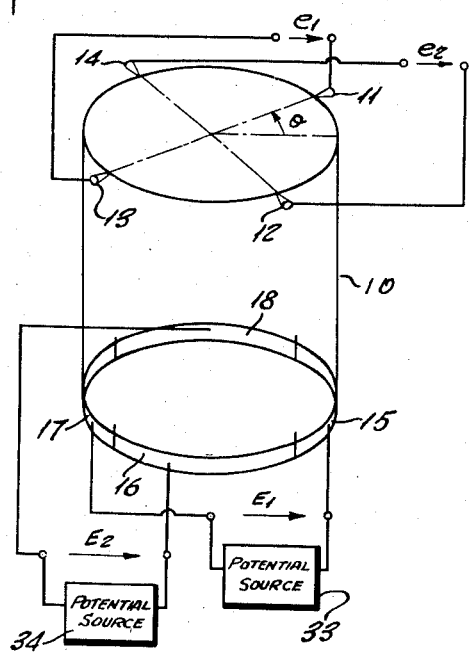
Fig. 6 is a diagrammatic illustration of a resolver embodying the invention with another modification of the electrical connections.

It will be understood that resolvers embodying the invention may be used with voltages instead of currents, as inputs and outputs. An example of this is shown in Fig. 6, where opposite segments of the conductive ring are connected together through potential sources 33 and 34, and differences in potential $e_1$ and $e_2$ between opposite brushes appear as outputs.

If the input from the source 33 is $E_1$, and the input from the source 34 is $E_2$; then the potential difference $e_1$ between the brushes 11 and 13, and the potential difference $e_2$ between the brushes 12 and 14 may be expressed as:

$$e_1=c(E_1 \cos \theta-E_2 \sin \theta) \quad (12)$$
$$e_2=c(E_1 \sin \theta+E_2 \cos \theta)$$

where $c$ is the same constant that appears in (1).

The potential difference outputs $e_1$ and $e_2$ will contain the same harmonic errors as the output currents $i_1$ and $i_2$ and the unwanted harmonics may be eliminated from potential difference outputs $e_1$ and $e_2$ in the same manner as has been described for the elimination of harmonics from the output currents $i_1$ and $i_2$.

If the potential sources 33 and 34 are center-tapped, it will be found that both center taps are at the same potential. Moreover, it will be found that this common potential is midway between the potentials of the brushes 11 and 13, and also midway between the potentials of the brushes 12 and 14. Therefore, if this common potential is assigned the value zero, it will be found that the potential on the brush 11 is separately equal to $$\frac{c}{2}(E_1 \cos \theta-E_2 \sin \theta)$$

and that the potential on the brush 12 is separately equal to $$\frac{c}{2}(E_1 \sin \theta + E_2 \cos \theta)$$

Under such conditions, the opposite brushes 13 and 14 would not be required.

Fig. 7 illustrates the application of a resolver embodying the invention to an analog computing circuit which is arranged to determine the length and direction of a continuously changing vector from the vector's rectangular components. It will be assumed that a vector has two components, $x$ and $y$, that are represented by voltages. The voltage $x$ is applied to a resistor 111 that is connected to the brush 11 and the voltage $-x$, which is obtained by inversion of the voltage $x$, is applied to a resistor 113 that is connected to the brush 13. Similarly, the voltage $y$ is applied to a resistor 112 connected to the brush 12, and the voltage $-y$ is applied to a resistor 114 connected to the brush 14.

The resistors are used to provide current regulation, since the resistance between the brushes may fluctuate as the brushes move relative to the resistive surface. If, moreover, the resistance of all the resistors is the same, the current entering the resistive surface 10 through the brush 11 will be equal to the current leaving through the brush 13, and will be proportional to the voltage $x$; and the current entering the surface 10 through the brush 12 will be equal to the current leaving through the brush 14, and will be proportional to the voltage $y$.

The conductive segments 16 and 18 are connected across the primary 100 of an input transformer 101 for a servo amplifier 102. A chopper 103 is connected across the primary of the transformer and causes an A.-C. voltage to appear at the secondary 104 of the transformer. This voltage is amplified by the servo amplifier and drives a servomotor 105, which in turn rotates the shaft of the resolver until the current in the primary of the input transformer becomes zero.

The segment 17 of the conductive ring is connected to ground, and the segment 15 of the conductive ring is connected to the grid of a high-gain D.-C. amplifier 107, having a feedback resistor 108 connected between its output and its grid. Since the grid draws no current, all the current that would normally flow directly from segment 15 to segment 17 flows instead through the feedback resistor 108, and the voltage $r$ which appears at the output of the amplifier is a measure of this current.

It now follows from the Equations 1 that, apart from a factor of proportionality, $$r = x \cos \theta + y \sin \theta$$
$$0 = -x \sin \theta + y \cos \theta$$

from which, in turn, it follows that $$\tan \theta = \frac{y}{x}$$

and $$r = \sqrt{x^2 + y^2}$$

The voltage $r$, then, is a measure of the length of the vector; and the angle $\theta$, which is the angle of rotation of the shaft of the resolver, is the angle the vector makes with the $x$-axis.

Structural details of a resolver embodying the invention are illustrated in Figs. 8 to 10, inclusive. In this resolver illustrated in these figures, there is a hollow right-circular cylinder 40, of insulating material which has a resistive surface 41 consisting of a film of carbon deposited on its inner surface. The dimensions of the cylinder 40 are as follows: The inner diameter is 1½ inches, the outer diameter is 2 inches, and the height is 2 inches.

The top of the cylinder 40 is closed by a cap 42, which may be made of aluminum and is secured to the cylinder by screws 43. The cap is provided with a flange 44 so that the resolver may be mounted in a suitable hanger and has a central opening 45 therein which is aligned with the central axis of the cylinder 40. The opening 45 contains a ball bearing 46 in which a rotatable shaft 47 is journalled. The shaft extends axially of the cylinder and is journalled at the other end of the cylinder in a ball bearing 48 which is located in a central opening 49 in a bottom disc 50. Thus, the bearings 46 and 48 hold the rotatable shaft 47 in accurate alignment with the central axis of the cylinder 40.

Beneath the bottom disc 50 there is a short cylindrical section 51 of insulating material having approximately the same outside diameter as the cylinder 40. Screws 52 hold the cylindrical member 51 and the disc 50 in place at the bottom of the cylinder 40.

A brush assembly is disposed within the cylinder 40 and consists of an octagonal block of insulating material 53 having a hub 54 which is fixed on the shaft 47 by a set screw 55. The block of insulating material 53 carries four aluminum cylinders 56 which extend radially therefrom and are spaced 90° apart. The outer end of each of the cylinders 56 is covered by a cap 57 of insulating material which has a central opening 58 therein. Each of the cylinders 56 contains a closely fitting brush 59 having a pointed end 60 which projects through the opening in the cap and contacts the resistive surface 41 under pressure of a coil spring 61. Thus, there are four equally spaced brushes 59 which ride in a common circular path about the top edge of the cylinder 40 and in contact with the resistive surface 41.

The electrical connections to the brushes 59 are made by wires 62 which extend through slots 63 at the lower end of the shaft 47 into the center of a slip ring assembly 64, which is attached to and carried at the lower end of the shaft 47. The slip ring assembly is provided with four separate conductive slip rings 65 to each of which one of the wires 62 is connected. Sliding contacts are made to the slip rings by means of V-shaped springs 66 which are supported on posts 67 within the cylindrical section 51 and are connected to terminals 68.

Four conductive segments 69 are formed at the lower end of the resistive surface by a band of silver paint whose upper boundary is spaced by about 1½ inches from the brushes. The conductive segments are of 120°, 60°, 120°, and 60°, respectively. Electrical contact is made with the segments by spring contacts 70 which are supported on the bottom disc 50. The spring contacts 70 are secured to the disc 50 by conductive rivets 71, and if the disc is made of metal, the contacts and rivets are insulated from the disc 50 by a washer 72 of insulating material surrounding the central opening in the disc and by sleeves 73 of insulating material surrounding the rivets 71. The rivets 71 are contacted by springs 74 supported inside of the cylindrical section 51 by terminal posts 75 and are connected to terminal 76. Thus, each of the four segments 69 is connected to one of the terminals 76, while each of the four brushes 59 is connected to one of the terminals 68.

Fig. 10 of the drawings is a developed view of the resistive surface 41 with the silver segments 69 thereon. Divisions 77 separating the four segments 69 are cut through the resistive surface to the underlying insulating material and extend upward a small distance past the top boundary of the segments. The brush ends 60 indicated at the top of Fig. 10 ride on the surface 41 along the line 78.

It will be understood that various modifications, alterations, and changes may be made in the embodiments of the invention illustrated and described herein without departing from the scope and spirit of the invention as defined by the following claims.

I claim:

1. A resolver comprising a cylindrical surface of resistive material, means for establishing an electric current field in said surface, said means including at least one brush contacting the resistive surface and being angularly movable with respect thereto, and means for determining the configuration of the electric current field along equipotential lines on said surface, said equipotential lines being spaced at a distance from said brush.

2. A resolver as defined in claim 1 wherein the distance between the equipotential lines on the resistive surface and the brush is approximately twice the radius of the cylindrical surface.

3. A resolver as defined in claim 1 wherein the means for determining the configuration of the electric current field includes a segmented band of a highly conductive material applied to the resistive surface, said segmented band having an upper edge forming the equipotential lines on the resistive surface.

4. A resolver as defined in claim 1 wherein the means for determining the configuration of the electric current field includes a segmented band of a highly conductive material applied to the resistive surface, said segmented band having an upper edge forming the equipotential lines on the resistive surface and consisting of four equal segments of 90 degrees each.

5. A resolver as defined in claim 1 wherein the means for determining the configuration of the electric current field includes a segmented band of a highly conductive material applied to the resistive surface, said segmented band having an upper edge forming the equipotential lines on the resistive surface and consisting of four segments that are alternately of 120 degrees and 60 degrees.

6. A resolver comprising a cylindrical surface of resistive material, means for establishing an electric current field in said surface, said means including spaced brushes contacting said surface midway between the ends thereof and being movable with respect thereto, and means located at each end of said cylindrical surface for determining the configuration of the electric current field along equipotential lines on said surface.

7. A resolver as defined in claim 6 wherein the distance between the equipotential lines at each end of the cylindrical surface is approximately equal to four times the radius thereof.

8. A resolver as defined in claim 6 wherein the means for determining the configuration of the electric current field includes segmented bands of a highly conductive material applied to each end of the cylindrical surface, said bands having divisions between the segments thereof with the divisions in one band being offset from the divisions in the other band.

9. A resolver as defined in claim 6 wherein the means for determining the configuration of the electric current field includes segmented bands of a highly conductive material applied to each end of the cylindrical surface, said bands having divisions between the segments thereof with the divisions in one band being offset from the divisions in the other band, and the segments of each band are of 90 degrees each.

10. A resolver as defined in claim 6 wherein the means for determining the configuration of the electric current field includes segmented bands of a highly conductive material applied to each end of the cylindrical surface, said bands having divisions between the segments thereof with the divisions in one band being offset from the divisions in the other band, and the segments of each band are alternately 120 degrees and 60 degrees.

11. A resolver comprising a resistance element formed as a right circular cylinder having spaced upper and lower edges, contact means engaging with the resistance element along a circular path at the upper edge thereof, said contact means including at least two contact brushes contacting the resistance element, said brushes and the resistance element being rotatable relative to each other, a band of highly conductive material applied to the resistance element at the lower edge thereof, said band being divided into spaced, arcuate segments.

12. A resolver as defined in claim 11 wherein the conductive band is divided into four segments of 90 degrees each.

13. A resolver as defined in claim 11 wherein the conductive band is divided into two opposing arcuate segments of 120 degrees each and two opposing arcuate segments of 60 degrees each.

14. A resolver as defined in claim 11 wherein the conductive band is divided into four opposing arcuate segments of 50 degrees with two arcuate segments of 20 degrees between the segments of 50 degrees.

15. A resolver as defined in claim 11 wherein the conductive band is divided into four segments of 90 degrees each and the ratio of the height of the resistance element to the radius thereof is substantially equal to two.

16. A resolver as defined in claim 11 wherein the conductive band is divided into two opposing arcuate segments of 120 degrees each and two opposing arcuate segments of 60 degrees each and the ratio of the height of the resistance element to the radius thereof is substantially equal to two.

17. A resolver as defined in claim 11 wherein the conductive band is divided into four opposing arcuate segments of 50 degrees with two arcuate segments of 20 degrees between the segments of 50 degrees and the ratio of the height of the resistance element to the radius thereof is substantially equal to two.

18. A resolver comprising a resistance element formed as a cylinder having upper and lower edges, contact means engaging with said resistance element along a circular path at the center thereof, said contact means being rotatable relative to the resistance element, conductive bands applied to the upper and lower edges thereof, said bands being divided into arcuate segments with the divisions in the upper band being shifted angularly with respect to the divisions in the lower band.

19. A resolver as defined in claim 18 wherein the distance between the conductive bands is of the order of four times the radius of the cylindrical surface.

20. A resolver comprising a resistance element formed as a right circular cylinder having spaced upper and lower edges, contact means engaging with said resistance element midway between the ends thereof, said contact means including at least two spaced contact brushes, said brushes and the resistance element being movable relative to each other, and segmented bands of a highly conductive material applied to the cylindrical resistive element at each end thereof, said bands forming arcuate segments with divisions therebetween, the divisions between segments in one band being shifted angularly with respect to the divisions between segments in the other band.

21. A resolver as defined in claim 20 wherein the distance between the conductive bands is of the order of four times the radius of the cylindrical surface.

22. A resolver as defined in claim 20 wherein the distance between the conductive bands is of the order of four times the radius of the cylindrical surface and the segments of each band are 90 degrees each.

23. A resolver as defined in claim 20 wherein the distance between the conductive bands is of the order of four times the radius of the cylindrical surface and the segments of each band are alternately 120 degrees and 60 degrees.

24. Electromechanical apparatus comprising a resistive element, a band conductively joined to said resistive element, said band being divided into conducting segments each insulated from its adjacent segment, and brush contact means engaging said resistive element at a fixed distance from said band, said brush contact means and said resistive element being movable with respect to each other along a line parallel of said band.

25. Electromechanical apparatus comprising a resistive element having two edges, bands conductively joined to said resistive element along each edge thereof, said bands being divided into conducting segments each insulated from its adjacent segments, and brush contact means engaging said resistive element intermediate said bands, said brush contact means and said resistive element being movable with respect to each other along a line parallel to said bands.

26. Electromechanical apparatus comprising a hollow cylinder of insulating material, a resistive coating deposited on the inside surface of said cylinder, a rotatable shaft, bearing means, said bearing means coaxially positioning said rotatable shaft within said hollow cylinder, a brush holder assembly including radially extending arms rigidly fastened to said shaft near one end of said cylinder, brushes resiliently attached to the ends of said spaced arms, said brushes electrically contacting said resistive coating, a slip ring assembly attached to said rotatable shaft and electrically connected to said brushes, and a band conductively joined to said resistive coating near the other end of said cylinder, said band being divided into conducting segements each insulated from its adjacent segment.

27. Electromechanical apparatus as defined in claim 26 wherein the band comprising the conductive segments consists of four equal segments of 90 degrees each.

28. Electromechanical apparatus as defined in claim 26 wherein the band comprising the conductive segments consists of four segments that are alternately of 120° and 60°.

29. Electromechanical apparatus as defined in claim 26 wherein the band comprising the conductive segments consists of twelve segments, four of said segments of 50 degrees each and eight of said segments of 20° each, said segments being arranged such that every third segment is 50° and each of the remaining segments is 20° each, each 50° segment being electrically connected to the two nearest 20° segments not adjacent the 50° segment.

30. Electromechanical apparatus comprising a hollow cylinder of insulating material, a resistive coating deposited on the inside surface of said cylinder, a cap having an axial aperture containing a bearing surface therein, said cap covering the top of said cylinder, a disc having a central bearing surface, said disc being attached to the bottom of said cylinder, a rotatable shaft, said shaft situated within said hollow cylinder and being positioned by the bearing surfaces of said cap and said disc, a slip ring assembly attached to a portion of said shaft, a brush holder assembly including radially extending arms rigidly fastened to said shaft near the top of said cylinder, brushes resiliently attached to the ends of said spaced arms, said brushes electrically contacting said resistive coating and being electrically connected to said slip ring assembly, a band conductively joined to said resistive coating near the bottom of said cylinder, said band being divided into conducting segments each being insulated from its adjacent segment, and terminal means electrically connected to said conducting segments.

31. Electromechanical apparatus comprising a cylindrical resistive element having two spaced edges, a plurality of arcuate highly conductive segments conductively joined to said resistive element along at least one edge thereof, said conductive segments being insulated one from the other, and brush contact means engaging said cylindrical resistive element at a fixed distance from said conductive segments, said brush contact means and said resistive element being movable with respect to each other.

32. Electromechanical apparatus comprising a cylindrical surface of resistive material, said surface having two spaced edges, means for establishing an electric field in said surface, said means comprising a segmented conducting band located adjacent to one edge of said surface, and means for determining the configuration of said electric field, said means including at least one brush means contacting the resistive surface and being angularly movable with respect thereto.

33. Electromechanical apparatus comprising a cylindrical surface of resistive material, said surface having two spaced parallel edges, at least one segmented band of highly conductive material, said segmented band being conductively joined to said cylindrical surface along a line parallel to an edge of said surface, brush contact means engaging said cylindrical surface at a fixed distance from said segmented band, said brush contact means and said cylindrical surface being movable with respect to each other, and current generating means coupled to said brush contact means, said current generating means establishing an electric current field in said cylindrical surface.

34. Electromechanical apparatus comprising a cylindrical surface of resistive material, said surface having two spaced parallel edges, highly conductive bands conductively joined to said cylindrical surface adjacent said spaced parallel edges, said bands being divided into spaced arcuate segments, and brush contact means engaging said cylindrical surface at a fixed distance from said conductive bands, said brushes being rotatable about the axis of said cylinder.

References Cited in the file of this patent

UNITED STATES PATENTS

| | | |
|---|---|---|
| 2,457,178 | Richardson et al. | Dec. 28, 1948 |
| 2,764,657 | Rosenthal | Sept. 25, 1956 |